(12) United States Patent
Cheatle

(10) Patent No.: US 9,049,419 B2
(45) Date of Patent: Jun. 2, 2015

(54) IMAGE ALBUM CREATION

(75) Inventor: Stephen Philip Cheatle, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 166 days.

(21) Appl. No.: 13/380,027

(22) PCT Filed: Jun. 24, 2009

(86) PCT No.: PCT/US2009/048388
§ 371 (c)(1),
(2), (4) Date: Dec. 21, 2011

(87) PCT Pub. No.: WO2010/151255
PCT Pub. Date: Dec. 29, 2010

(65) Prior Publication Data
US 2012/0106859 A1    May 3, 2012

(51) Int. Cl.
| | |
|---|---|
| *G06K 9/00* | (2006.01) |
| *G06K 9/62* | (2006.01) |
| *H04N 5/76* | (2006.01) |
| *H04N 5/91* | (2006.01) |
| *G06T 11/60* | (2006.01) |
| *G11B 27/034* | (2006.01) |
| *G11B 27/28* | (2006.01) |
| *H04N 1/00* | (2006.01) |
| *G06Q 10/04* | (2012.01) |
| *H04N 1/387* | (2006.01) |
| *H04N 5/765* | (2006.01) |

(Continued)

(52) U.S. Cl.
CPC *H04N 5/91* (2013.01); *G06T 11/60* (2013.01); *G11B 27/034* (2013.01); *G11B 27/28* (2013.01); *H04N 1/00161* (2013.01); *H04N 1/00196* (2013.01); *H04N 5/765* (2013.01); *H04N 5/772* (2013.01); *H04N 9/8205* (2013.01); *G06Q 10/043* (2013.01); *H04N 1/387* (2013.01); *H04N 1/3872* (2013.01)

(58) Field of Classification Search
None
See application file for complete search history.

(56) References Cited

U.S. PATENT DOCUMENTS

| | | | |
|---|---|---|---|
| 6,323,898 B1 | 11/2001 | Koyanagi et al. | |
| 6,324,545 B1 * | 11/2001 | Morag | 707/737 |

(Continued)

FOREIGN PATENT DOCUMENTS

| | | |
|---|---|---|
| CN | 101331522 A | 12/2008 |
| JP | 2008217479 A | 9/2008 |

(Continued)

OTHER PUBLICATIONS

Search Report and Written Opinion PCT/US2009/048388; Mar. 17, 2010.

(Continued)

*Primary Examiner* — Bhavesh Mehta
*Assistant Examiner* — David F Dunphy
(74) *Attorney, Agent, or Firm* — Van Cott, Bagley, Cornwall & McCarthy

(57) ABSTRACT

A method for creating an image album includes selecting a subset of images from a source set and creating a plurality of image albums by arranging the subset of images over one or more pages. Each image album is evaluated by a penalty detection unit to generate a penalty score which is a measure of the aesthetic quality of an image album. One or more of the image albums having the lowest penalty scores are presented to the user. A system for arranging a number of images into an image album is also provided.

19 Claims, 4 Drawing Sheets

(51) Int. Cl.
  *H04N 5/77* (2006.01)
  *H04N 9/82* (2006.01)

(56) References Cited

U.S. PATENT DOCUMENTS

| | | | |
|---|---|---|---|
| 6,445,810 B2 | 9/2002 | Darrell et al. | |
| 7,035,477 B2 | 4/2006 | Cheatle | |
| 7,133,571 B2 | 11/2006 | Cheatle | |
| 7,203,380 B2 | 4/2007 | Chiu et al. | |
| 7,262,781 B2* | 8/2007 | Balinsky et al. | 345/620 |
| 7,340,676 B2 | 3/2008 | Geigel et al. | |
| 7,382,903 B2 | 6/2008 | Ray | |
| 7,443,418 B2* | 10/2008 | Bryant et al. | 348/207.1 |
| 7,636,450 B1 | 12/2009 | Bourdev | |
| 7,668,405 B2 | 2/2010 | Gallagher | |
| 8,316,301 B2 | 11/2012 | Kim et al. | |
| 2002/0122067 A1* | 9/2002 | Geigel et al. | 345/788 |
| 2002/0191861 A1 | 12/2002 | Cheatle | |
| 2003/0072486 A1 | 4/2003 | Loui et al. | |
| 2003/0117651 A1 | 6/2003 | Matraszek | |
| 2004/0054659 A1 | 3/2004 | McIntyre | |
| 2004/0120009 A1 | 6/2004 | White et al. | |
| 2004/0187078 A1 | 9/2004 | Girgensohn | |
| 2005/0111737 A1 | 5/2005 | Das et al. | |
| 2005/0165841 A1 | 7/2005 | Kasperkiewicz et al. | |
| 2005/0168779 A1 | 8/2005 | Tsue et al. | |
| 2005/0276477 A1 | 12/2005 | Lin et al. | |
| 2006/0041564 A1 | 2/2006 | Jain et al. | |
| 2006/0074973 A1* | 4/2006 | Platt et al. | 707/102 |
| 2006/0200758 A1 | 9/2006 | Atkins | |
| 2006/0253491 A1 | 11/2006 | Gokturk et al. | |
| 2006/0257048 A1 | 11/2006 | Lin et al. | |
| 2006/0271691 A1* | 11/2006 | Jacobs et al. | 709/228 |
| 2006/0279555 A1 | 12/2006 | Ono | |
| 2007/0064121 A1 | 3/2007 | Issa et al. | |
| 2007/0115373 A1* | 5/2007 | Gallagher et al. | 348/231.3 |
| 2008/0050039 A1 | 2/2008 | Jin | |
| 2008/0123993 A1 | 5/2008 | Widdowson | |
| 2008/0219564 A1 | 9/2008 | Covell et al. | |
| 2009/0034842 A1 | 2/2009 | Grosvenor | |
| 2009/0034849 A1 | 2/2009 | Grosvenor | |
| 2009/0116752 A1 | 5/2009 | Isomura et al. | |
| 2009/0185723 A1* | 7/2009 | Kurtz et al. | 382/118 |
| 2010/0066758 A1 | 3/2010 | Mondry et al. | |
| 2010/0156834 A1 | 6/2010 | Sangster | |
| 2010/0329550 A1 | 12/2010 | Cheatle | |
| 2010/0329588 A1 | 12/2010 | Cheatle | |
| 2012/0002881 A1 | 1/2012 | Maeda | |
| 2012/0106859 A1 | 5/2012 | Cheatle | |

FOREIGN PATENT DOCUMENTS

| | | |
|---|---|---|
| WO | WO-2010047843 A1 | 4/2010 |
| WO | WO-2010151255 A1 | 12/2010 |
| WO | WO-2010151257 A1 | 12/2010 |

OTHER PUBLICATIONS

A. Gallagher and T. Chen, "Clothing cosegmentation for recognizing people," IEEE Conf. on Computer Vision and Pattern Recognition, 2008, CVPR 2008, Jun. 2008, pp. 1-8.
International Searching Authority, International Search Report & Written Opinion, Mar. 17, 2010, 12 pages.
J. Winn, A. Criminisi, and T. Minka, "Object Categorization by Learned Universal Visual Dictionary," ICCV, 2005.
N Dalal and B. Triggs, "Histograms of Oriented Gradients for Human Detection," IEEE Conference on Computer Vision and Pattern Recognition, 2005.
P. Viola and M. Jones, "Rapid Object Detection Using a Boosted Cascade of Simple Features," IEEE Conf. Computer Vision Pattern Recognition, 2001.
T. Cour, F. Benezit, and J. Shi, "Spectral Segmentation with Multiscale Graph Decomposition," CVPR, 2005.
W. Gao, H. Ai and S. Lao, "Adaptive contour features in oriented granular space for human detection and segmentation," IEEE Conf. on Computer Vision and Pattern Recognition, 2009, CVPR 2009, Jun. 2009, pp. 1786-1793.
X. Bai, Q. Li, L. Latecki, W. Liu and Z. Tu, "Shape band: a deformable object detection approach," IEEE Conf. on Computer Vision and Pattern Recognition, 2009, CVPR 2009, Jun. 2009, pp. 1335-1342.
Y. Song and T. Leung, "Context-aided human recognition—clustering," European Conference on Computer Vision, 2008, Computer Vision—ECCV 2006, pp. 382-395.
Atkins, C. Brian; "Blocked Recursive Image Composition;" Proceeding of the 16th ACM international conference on Multimedia; Oct. 26, 2008; pp. 821-824.
Collins-Thompson, et al., "A Clustering-based Algorithm for Automatic Document Separation," Proceedings of the SIGIR 2002 Workshop on Information Retrieval and OCR, 2002, 5 pg.
Grosvenor, Dave; "The use of a cast to generate person-biased photo-albums;" HP Laboratories Bristol; 2007; <http://www.hpl.hp.com/techreports/2007/HPL-2007-12.pdf>.
Extended European Search Report for European patent application No. 09846629; Jan. 31, 2013;10 pages.
Extended European Search Report received for EP Application No. 09846630; dated Nov. 20, 2012; 7 pages.
Grosvenor et al., "Using the emphasis statistics of a cast for the automatic layout of a photo-album," HP Laboratories Bristol, 2007, <http://www.hpl.hp.com/techreports/2007/H.
Hewlett Packard Development Company, L.P., "Frustration-free photo books," (Web page), Oct. 2009, <http://www.hpl.hp.com/news/2009/oct-dec/magicphotobook.html>.
International Preliminary Report on Patentability received for PCT Application No. PCT/US2009/048388; Jan. 4, 2012; 6 pages.
International Preliminary Report on Patentability received for PCT Application No. PCT/US2009/048403; Jan. 12, 2012; 8 pages.
International Search Report & Written Opinion received for PCT Application No. PCT/US2009/048403; Mar. 11, 2010; 13 pages.
Snapfish by HP; "Photo Books," Help, (Web Page), Aug. 18, 2007; <http://web.archive.org/web/20070818022213/http://www.snapfish.com/helpphotobooks>.
Wallick et al.; "Automatic Organization of Photograph Collections," Mar. 30, 2007; <http://pages.cs.wisc.edu/~michaelw/papers/uist07.pdf>; 8 pages.
Xiao et al., "Mixed-initiative photo collage authoring," Proceedings of the 16th ACM international conference on Multimedia, ACM, Oct. 2008, pp. 509-518, <http://www.hpl.hp.co.
International Preliminary Report on Patentability received in PCT Application No. PCT/US2009/048388; Jan. 12, 2012, 7 pages.
Jingyu Cui et al.; Easyalbum: an Interactive Photo Annotation System Based on Face clustering and Re-ranking (Research Paper) Publication Date: Apr. 28-May 3, 2007.
Matthew Cooper, et al.; Temporal event clustering for digital photo collections, 2005, ACM Trans. Multimedia Comput. Commun. Appl., 1(3):269-288.
Office Action received in patent publication No. 20100329588/patent No. 8180178; Dec. 6, 2011; 7 pages.
Office Action received in patent publication No. 20120275666; May 16, 2013; 15 pages.
Office Action received in patent publication No. 20120275666; Sep. 19, 2013; 15 pages.
Office Action received in U.S. Appl. No. 13/380,030, Mar. 4, 2014, 11 pages.
Office Action received in U.S. Appl. No. 13/380,030, Oct. 30, 2013, 16 pages.
Zhang, T. et al., "Face Based Image Navigation and Search," Proceedings of the 17th ACM International Conference on Multimedia, Oct 19-24, 2009, pp. 597-600, <https://www.msti.edu/~wendi/publication/ACM09.pdf>.

* cited by examiner

IMAGE ALBUM CREATION

BACKGROUND

With the advent of the digital camera, professional and lay photographers have been able to more easily and conveniently upload, store, edit, and enhance their digital images. These digital cameras allow a photographer to send digital images captured by a digital camera via a data transfer means such as by direct data transfer (e.g. memory-to-memory transfer), email, and the internet. Additionally, a photographer may order prints by sending digital images captured by a digital camera to a retailer or vendor, who then uploads the digital images, prints the digital images, and sends the prints to the photographer.

A photographer may wish to arrange his or her digital images in a photo album or other compilation of a number of images. Such a compilation of images may serve several functions or have advantages over a single image print. One advantage to creating a compilation of images is that an arrangement or layout of images in a compilation may be aesthetically appealing. Another advantage to creating a compilation of images is that a viewer may easily view several images of any number of subjects, and appreciate the compilation of the individual images as a whole as well as the individual images themselves. These compilations of images may be presented in tangible form as in the case of a photo album, or in an intangible form through the use of computer software or websites.

Presently, computing devices such as personal computers, and associated software can be utilized to create such albums or compilations. However, present computing devices, software, and methods of creating image albums can be inconvenient and limit a photographer's artistic freedom in designing various aspects of the compilation. Further, these systems do not allow a user to select, edit, and arrange images in an album or other compilation while still controlling specific design aspects which influence the overall compilation. In other words, none of these systems and methods provide for a means to optimize an entire album or other compilation of images using multiple levels of design techniques.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present application discloses a number of illustrative systems and methods for creating an album or other compilation of images that allow design considerations to control the overall optimization of the album, and which reflect the aesthetic decisions of skilled or professional designers. More specifically, the present application discloses illustrative systems and methods for selecting, editing, and arranging a number of images in an album or other compilation while satisfying many design constraints. These systems and methods may apply various techniques in satisfying these design constraints including, but not limited to, content-based selection and arrangement of images, and penalty-based selection, editing, and arrangement of images for use in creating an aesthetically appealing compilation of images.

As used in the present specification and in the appended claims, the terms "album" and "compilation" are meant to be understood broadly as any arrangement of a number of images in either a tangible or an intangible form. Further, as used in the present specification and in the appended claims, the term "metadata" is meant to be understood broadly as any definitional data that provides information about or documentation of other data managed within an application or environment. As used in the present specification and in the appended claims, the term "image" is meant to be understood broadly as any tangible or intangible representation of a subject including, but not exhaustive of, a person or persons, animals, places, events, or things.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1A:
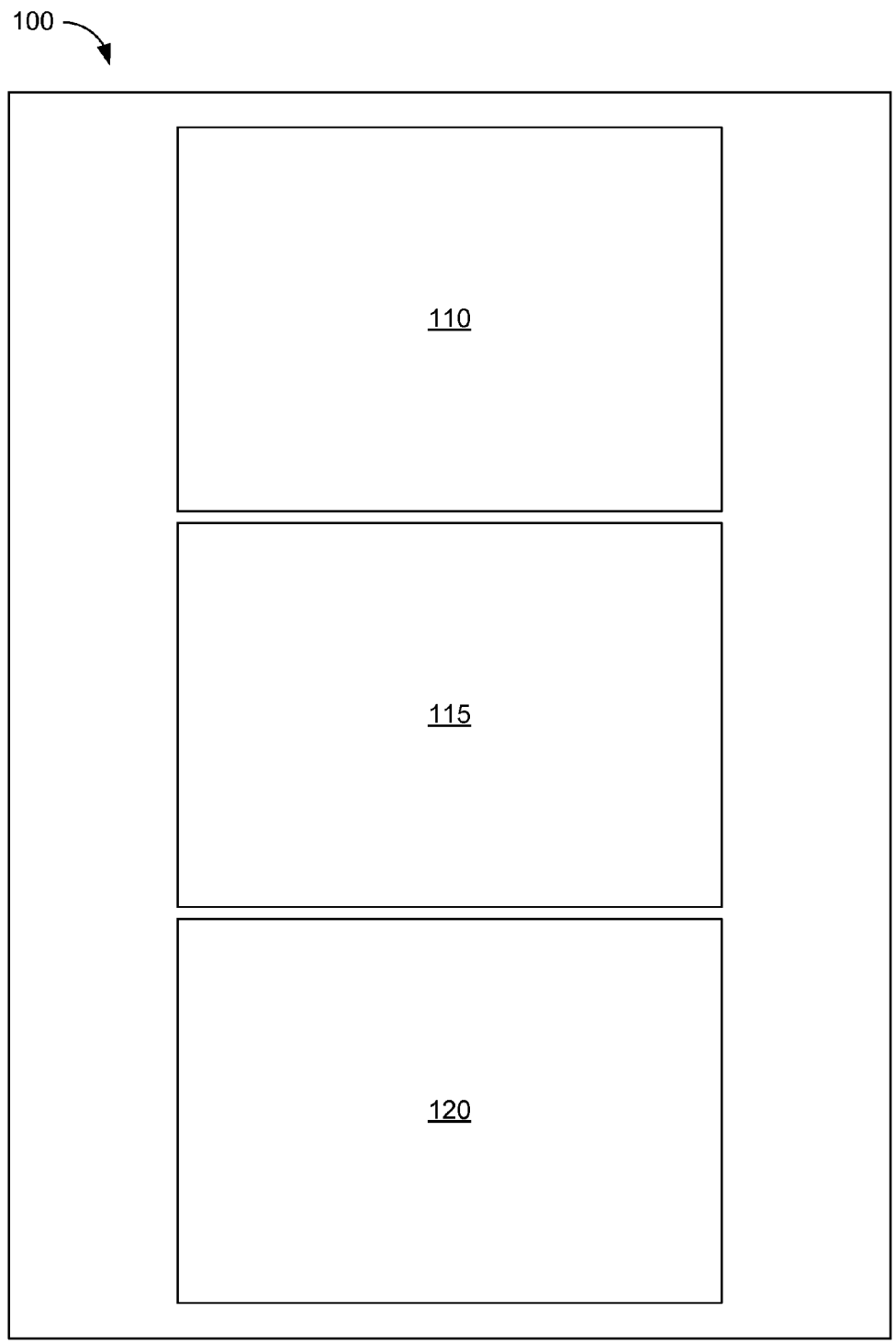
FIG. 1A is a block diagram of an illustrative compilation of images, according to one embodiment of principles described herein.
Figure 1B:
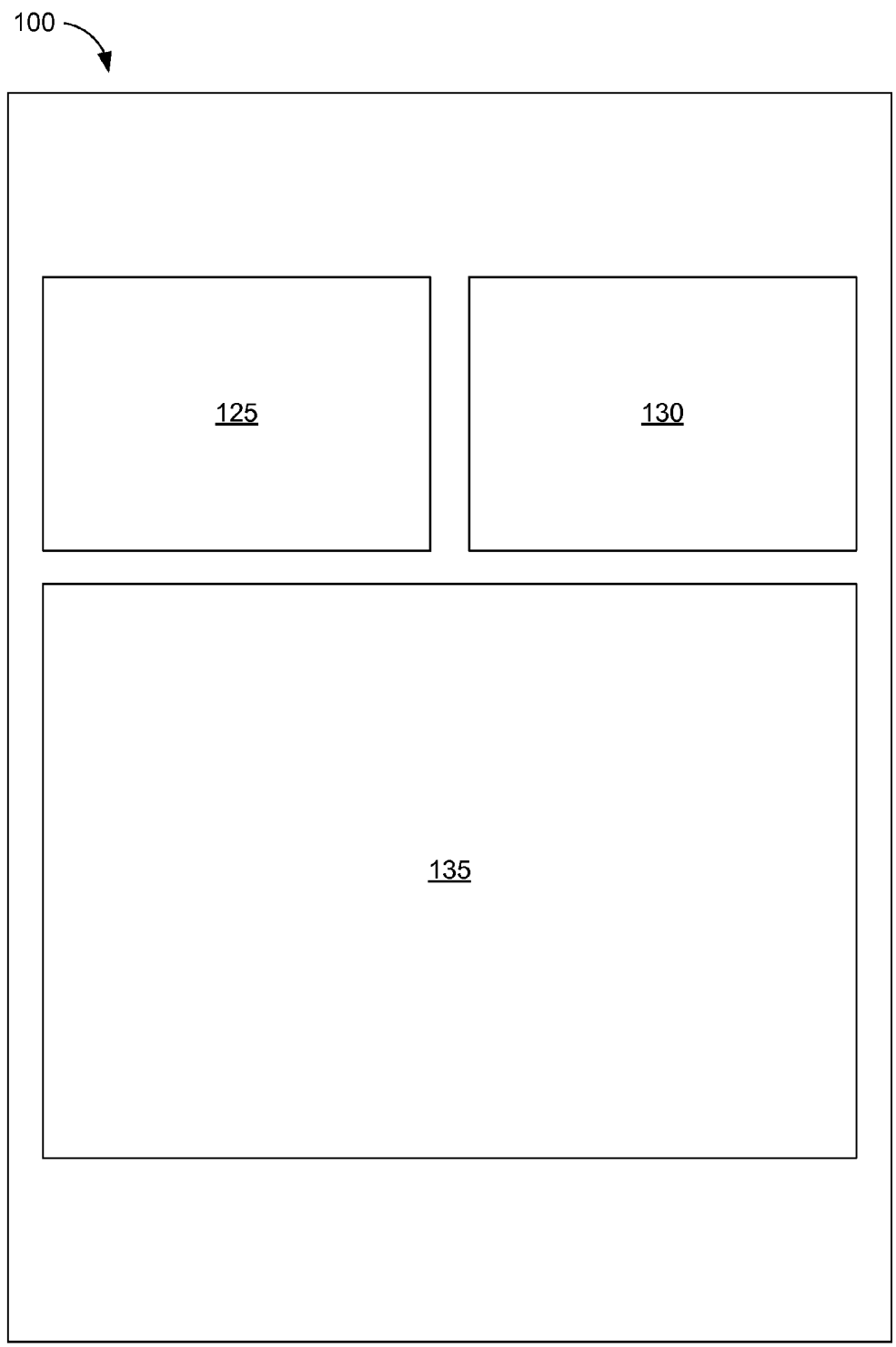
FIG. 1B is another block diagram of an illustrative compilation of images, according to one embodiment of principles described herein.

Generally, a photo album or compilation creation method may include the following major steps: (1) selecting image subsets, (2) allocating selected images onto themed pages, (3) editing the images as an optional step, (4) cropping (including auto-cropping) the images as an optional step, and (5) arranging the images on each page (scale, position, rotate, overlap, etc.). Prior means of creating compilations have made it difficult to create photo albums or other compilations that optimize the overall effect of design considerations relating to all of the construction steps. The best systems may optimize particular steps (such as autocrop or arrangement) in isolation, or they may jointly optimize a few of the steps (such as autocrop and arrangement together). In contrast, this specification describes a method for image album creation which has the ability to find an optimal solution which takes many different design considerations into account, such as selecting different images based on the layout of a page to achieve a more aesthetically pleasing arrangement. By way of an example of an instance wherein design considerations were not taken into consideration, FIG. 1A is a block diagram illustrating a compilation of images. Similarly. FIG. 1B is another block diagram illustrating a compilation of images with a different arrangement than that displayed in FIG. 1A.

With reference to FIG. 1A, a page (100) of a photo album or other compilation may include three images (110, 115, 120). The above-mentioned image subset selection step may select these three images (110, 115, 120) for a page (100) of a photo album or other compilation, each of which is to be arranged in a landscape orientation, and each of which contain a high degree of detail. Thus, each of the three images (110, 115, 120) would require a large area of the page (100). The subsequent arrangement step may be unable to generate a suitable arrangement that takes into consideration this design element. In one case, the three images (110, 115, 120) may be equal sized, and placed down the center of the page (100). This can create an uninteresting arrangement and leaves a significant amount of empty space on the sides of the page (100) as depicted in FIG. 1A.

FIG. 1B shows a page (140) of a photo album or other compilation may include three images (125, 130, 135). Again, the above-mentioned image subset selection step selected these three images (125, 130, 135) for the page (100) of a photo album or other compilation, each of which is to be arranged in a landscape orientation, and each of which contain a high degree of detail. Thus, each of the three images (125, 130, 135) would require a large area of the page (100). Again, the arrangement step may be unable to generate a suitable arrangement that takes into consideration this basic design element, and may arrange these three images (125, 130, 135) such that the size of two of the images (125, 130) would be sacrificed for the third image (135). However, this arrangement also leaves a large amount of empty space on the page (140), and does not allow for two of the images (125, 130) to have the size required for such detailed images.

A third option in connection with the above scenario may be to place two of the images on a single page (100) and move the third image to a separate page. However, this does not allow for all the images that were initially selected to be arranged together to be on the same page (100), and also leaves a large amount of empty space on the additional page. Other options may include omitting one of the images, thereby leaving 2 large images on the page or allocate the images to two facing pages instead of just one, and adding one or more additional pictures to fill the remaining area on the two facing pages. A fourth option would be to not select one or more of the images at all. However, this obviously leaves one or more of the images that were initially selected to be arranged together to be excluded from the arrangement, and makes moot the ability to include design considerations in the compilation. The proper selection of one of these operations can give rise to better overall designs. This selection may be influenced by a number of criteria, including the amount of flexibility permitted in the number of pages in the compilation and the page requirements of other images in the image source set. According to one illustrative embodiment, the image album creation system and method described below provide for global optimization between the selection state, the image content, and arrangement constraints.

Another example of how the present system and method improves photo album or compilation creation is by taking into consideration face direction of persons in the images. Professional designers generally arrange images on a page that the faces of the persons depicted in the image are directed to a particular portion of the page (e.g. the center of the page) or to a particular image on the page. If, in one scenario, the image subset selection step selects too many images that contain people looking in the same direction, then the subsequent arrangement step may be unable to arrange the images in a manner that reflects a professional designer's design choice. However, if, in the image subset selection step, the selection means is at least partially aware of the various constraints or preferences in arrangement of the images, images that can be arranged in a more aesthetically pleasing manner may be selected. According to one illustrative example, the selection means may simply generate a number of plausible alternatives. In a generate-and-test approach, each of these alternatives is tried and the resulting album evaluated to determine a global optimum.

The present system and method alleviate these, and other potential issues, by allowing design considerations to control the overall optimization of the album, as opposed to optimizing each stage of album creation independently, without consideration for the impact on following stages. Thus, a photo album or other compilation may be automatically created that reflects aesthetic design decisions of a professional designer.

Illustrative Structure

Figure 2:
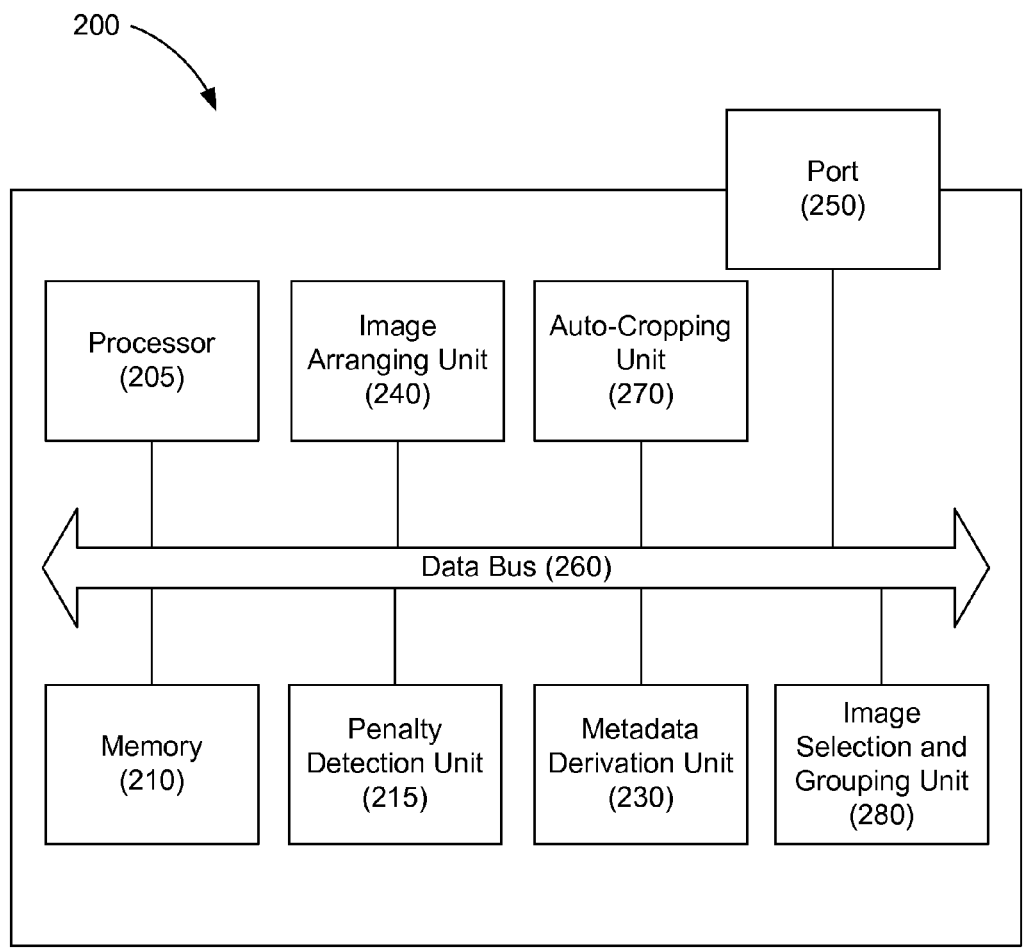
FIG. 2 is a block diagram of an illustrative computing device for arranging a number of images within a compilation, according to one embodiment of principles described herein.

FIG. 2 is a block diagram illustrating a computing device (200) for arranging a number of images within a compilation, according to an embodiment of the present illustrative system and method. The computing device (200) illustrated in FIG. 2 may be any electronic device configured to process and store data including, but not limited to, a workstation, personal computer, a laptop, a personal digital assistant (PDA), or any other processor containing device. The various components of the computing device (200) are preferably electrically coupled via a data bus (260).

As shown in FIG. 2, the computing device (200) includes a processor (210). The processor (210) controls the operation of the computing device (200), including a penalty detection unit (240). The penalty detection unit (240) may exist in hardware, as firmware, as software, or as combinations thereof. Further, the penalty detection unit (240) may exist external to the computing device (200). Still further, the penalty detection unit (240) may be embodied on a server accessible via the internet, wherein a website (e.g. Snapfish® by Hewlett-Packard, located at www2.snapfish.com) may provide services connected to and in association with the penalty detection unit (240). The penalty detection unit (24)) is configured to evaluate a possible compilation such that the most aesthetically appealing compilations receive the lowest penalty values, as will be discussed in more detail below.

The processor (210) may also control the operation of a metadata derivation unit (230). The metadata derivation unit (230) may exist in hardware, as firmware, as software, or as combinations thereof. Further, the metadata derivation unit (230) may exist external to the computing device (200). Still further, the metadata derivation unit (230) may be embodied on a server accessible via the internet, wherein a website (e.g. Snapfish®) may provide services connected to and in association with the metadata derivation unit (230). The metadata derivation unit (230) is configured to derive metadata from digital images so that the derived metadata may be utilized in the arrangement of the images in a compilation, as will be discussed in more detail below.

Memory (220) is used to store data representative of the digital images, metadata derived from the digital images, and any other data necessary for the function and use of the computing device (200) including, but not limited to, software including an operating system or other software configured to run various programs on the computing device (200). The memory (220) may include a combination of non-volatile memory, e.g. read-only memory (ROM), and volatile memory, e.g. Random Access Memory (RAM).

The computing device (200) may also include an image selection and grouping unit (280) which uses results of the metadata derivation unit (230) to cluster images, select appropriate image subsets for pages, etc. The computing device (200) may also contain an image arranging unit (240) for creating a composition of images based on the metadata derived by the metadata derivation unit (230). The image arranging unit (240) may exist in hardware, as firmware, as software, or as combinations thereof. Further, the image arranging unit (240) may exist external to the computing device (200). Still further, the image arranging unit (240) may be embodied on a server accessible via the internet, wherein a website (e.g. Snapfish®) may provide services connected to and in association with the image arranging unit (240).

Further, computing device (200) may also contain an auto-cropping unit (270) for determining an auto-crop cost function for different aspect ratios for a number of images, and automatically cropping the images based in the auto-crop cost function. The auto-cropping unit (270) may exist in hardware, as firmware, as software, or as combinations thereof. Further, the auto-cropping unit (270) may exist external to the computing device (200). Still further, the auto-cropping unit (270) may be embodied on a server accessible via the internet, wherein a website (e.g. Snapfish®) may provide services connected to and in association with the auto-cropping unit (270).

Finally, a number of ports (250) may be provided for importing digital images or other data to the memory (220) of the computing device (200), and outputting data that is representative of a finished composition of images. The ports (250) may be serial or parallel ports including, but not limited to, a USB port, and an IEEE-1394 port.

In one illustrative embodiment, the computing device (200) may be connected to a network of computers to allow data to be transferred to and from the various connected computers. Further, the computing device (200) may be connected to a number of printers to allow for the printing of images on a medium such as paper. Finally, the computing device (200) may be connected to a network (including the Internet) to allow for a user to upload and/or download image data to or from a webpage, store data on the webpage, edit images, and/or enhance digital images on the webpage.

Illustrative Implementation and Operation

Professional designers consider several factors when arranging images in any kind of compilation. A designer may consider, for example, colors, intensities, and/or textures existent in the images, complexity of the images, the number of persons or objects in the images, angles between persons and/or objects in the images, direction of persons or objects within the images, the minimum and maximum physical area to be occupied by the images (measured in square units like, for example, in$^2$), a minimum and maximum fraction of a page or album that an image should occupy, relative position of the images on a page or album, alignment of the images, and combinations thereof. Further, a designer may consider the above factors individually and as a whole.

Generally, a professional designer attempts to minimize aesthetically unpleasant or disagreeable elements of a photo album or compilation of images. The present system and method performs the steps a professional designer might take in creating an aesthetically pleasing photo album or other compilation of images by assigning certain disagreeable elements of a potential photo album arrangement a penalty. For example, the present system and method may assign an album penalty score, $Z_{album}$, which may be defined as the average penalty of all pages in a potential photo album arrangement. The album penalty score is a measure of the aesthetic quality of the album, with lower penalty scores indicating a higher quality album which has more desirable aesthetic characteristics. As used in the specification and appended claims aesthetic characteristics are measures of specific parameters related to an album and/or page which add visual appeal. These aesthetic characteristics may include, but are not limited to, image selection from a pool of available images, image variety on a page, image size, image cropping, the inclusion of "favorite" images, image arrangement, the shape of the images on the page, the content of the images on a given page or album, and other characteristics. The album penalty score described below specifically incorporates a number of quantitative aesthetic characteristics to measure the aesthetic quality of various image albums.

According to one illustrative embodiment, the present system and method may assign a page penalty, $Z_{page\ i}$, where "i" denotes the page number in the range 1 . . . P for an album with P number of pages. The penalty detection unit (FIG. 2, 240) is configured to evaluate the aesthetic appeal of a potential photo album by creating an album penalty score, $Z_{album}$ which is a combination of page penalties associated with the pages which make up the album.

One potential limitation of defining the overall album penalty, $Z_{album}$, as an average of the $Z_{page\ i}$ values of all the pages is that this may mask a particularly bad page. (i.e. one which has a particularly high $Z_{page\ i}$ value). In one illustrative embodiment, the page with the worst individual penalty may be identified and its penalty scored weighted by a multiplier, $W_1$. This weighted maximum page penalty is then added to the average of the $Z_{page\ i}$ values of all the pages. This multiplier $W_1$ can be used to mathematically emphasize the $Z_{page\ i}$ value of the particularly bad page to skew the overall album penalty $Z_{album}$ to avoid album configurations which include a particularly bad page. For example, the album multiplier $W_1$ could be 4, thereby increasing the $Z_{page\ i}$ value of the particularly bad page by a factor of four compared to other pages.

Further, another weighted term, $Z_{favorites}$ may be applied in situations to quantify the failure to include or emphasize a particular image among the various images. Favorites may be identified automatically. For example, the present system and method may be configured to select relatively unusual images that are known to have a high emotional value. Typical examples may include, for example, large groups of people, close up portraits, images that have been used in past photo albums, and images that are searched or viewed often. In another illustrative embodiment, a user may be allowed to manually identify his or her "favorite" images.

"Favorite" images are images that the present system and method must include in the photo album or other compilation of images. The existence of favorite images may also require the system to emphasize that image by allocating a greater amount of space on a given page of the photo album, present the image in a larger size relative to other images, placed the image at a particular position within a page (e.g. the center of the page), or otherwise give the image preferential treatment relative to other images. In one illustrative embodiment, the favorite image or images may occupy an area larger than a selected fraction of a page area, $A_{fav}$. Thus, $Z_{favorites}$ can represent the sum of the penalties for each favorite image that occupies less area than $A_{fav}$. In one illustrative embodiment, the weighted favorites penalty contribution may be in proportion with the under-representation of area.

Both of these extensions to the basic page average ($Z_{page}$ and $Z_{favorites}$) are optional, as suggested by their weighting multipliers, $W_1$ and $W_2$, both of which may be set to 0.0. These extensions may be represented in the following manner:

$$Z_{album} = \text{average}(Z_{page\ 1} \ldots Z_{page\ P}) + W_1 * \max(Z_{page\ 1} \ldots Z_{page\ P}) + W_2 * Z_{favorites}$$

The penalty function for an individual album page may consist of a weighted sum of four components:

$$Z_{page\ i} = W_3 * Z_{selection} + W_4 * Z_{crop} + W_5 * Z_{content\text{-}layout} + W_6 * Z_{shape\text{-}layout}$$

where $Z_{selection}$, $Z_{crop}$, $Z_{content\text{-}layout}$, and $Z_{shape\text{-}layout}$ are defined below.

$Z_{selection}$ is a penalty value representing the dissimilar properties or subject matter of the images selected for a given page. For example, a poorly-themed page, wherein the similarity between the content or subject matter of the images is large, may have a large $Z_{selection}$ value. The simplest measure of $Z_{selection}$ may be the maximum dissimilarity between any two images on a page.

$Z_{crop}$ is a penalty value representing how poorly the images are composed (e.g. after being automatically cropped). In one illustrative embodiment, this value may reflect the average of the crop penalties for each of the images on the page.

$Z_{content-layout}$ is the penalty value incurred for failing to obey the arrangement recommendations relating to the content of the photos on the page. For example, the present system and method may provide for a means to automatically or manually arrange images in a photo album page or other compilation of images based on the content or subject matter of the images. More specifically, the present system and method may arrange a number of images based on colors present in the images, the overall complexity of the images, the number of subjects within the images, or the layout of the subjects in the images by applying image analysis techniques such as color segmentation, face detection, and face feature detection in deriving metadata that reflects such design aspects. Based on the metadata derived from the images, the system may arrange the images on a page. Further, the system may provide recommendations to a user, and the user may manually arrange the images on a page. Failure to obey the content-based image arrangement recommendations may cause the page to incur a $Z_{conntent-layout}$ penalty.

Finally, $Z_{shape-layout}$ is a penalty value resulting from poor arrangement of shapes on a page. This penalty may be used by dynamic image arrangement methods that attempt to optimize the appearance of an image arrangement given a set of images according to some layout design criteria. For example, the images may be arranged and scaled so as to occupy a rectangular area on the page which occupies as much of the page area as possible, but maintaining a uniform gap between images and a fixed margin at the page edge. In this case the $Z_{shape-layout}$ penalty would be proportional to the wasted space on the page, not occupied by the image rectangle. In this case, wasted space is left when it is not possible to arrange the images in a rectangle of the same aspect ratio as the page.

As discussed above, the system generates a number of possible albums from a given set of source images. These alternative album designs may have different selections of images, different allocations of images to pages, different numbers of pages, different sizes of images, different arrangements of images on a page, etc. According to one illustrative embodiment, the system generates an album penalty $Z_{album}$ for each album arrangement. In most cases, each album will have some conflict between design heuristics and will have an album penalty which will be greater than zero. One or more albums with the lowest penalty scores are selected as the album arrangement(s) to be returned to the user.

Thus, the most aesthetically appealing album may be chosen from a number of alternative album designs by choosing the album with the minimum value of $Z_{album}$. However, it may be impractical to exhaustively test every possible combination of image selections, page allocations, image crops, and image layout arrangements for all possible pages. Instead, a reduction in potential combinations may be required to heuristically reduce the number of combinations which are evaluated to those that are likely to contain some good solutions. The penalty function, $Z_{album}$, may then be used to select between the reduced set of alternatives that have been considered.

Figure 3:
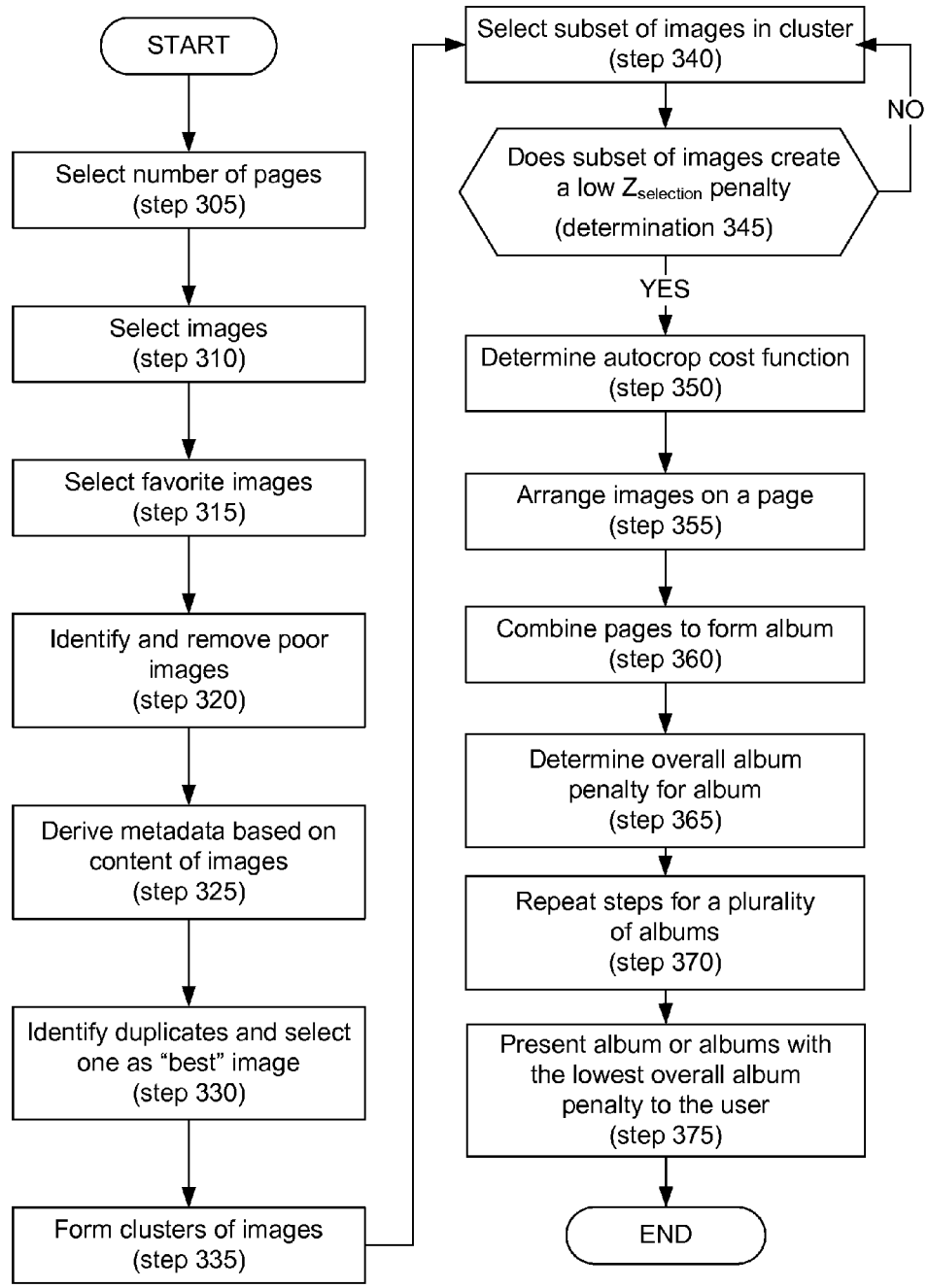
FIG. 3 is a flow chart illustrating a method of arranging a number of images within a compilation, according to one embodiment of principles described herein.

FIG. 3 is a flow chart illustrating a method of arranging a number of images within a compilation, according to an embodiment of the present illustrative system and method. FIG. 3 provides a means to narrow the number of potential image combinations. It will be apparent, however, to one skilled in the art, that the present systems and methods may be practiced without a number of the steps included in FIG. 3, and that any number or combination of steps may be optional. Further, it will be apparent, however, to one skilled in the art, that the various steps of the present method may be practiced in an order other than the order presented in FIG. 3.

As an initial step in FIG. 3, a number of pages, 1 . . . P, may be selected by a user (step 305). In one illustrative embodiment, the user may be prompted to select any number of pages. In another illustrative embodiment, a number of required pages may be selected automatically based in the number of images available. For example, a user may have preliminarily selected a number of images, and, based on the sizes of the images, the present system and method may automatically determine the requisite number of pages. In still another illustrative embodiment, a range of permissible numbers of pages, $P_{min}$ to $P_{max}$, may be selected automatically or manually by a user.

Next, the user may be prompted to identify the total pool of images from which the album is to be constructed (step 310). The user may define the total pool of images from which the album is to be constructed in any number of ways. In one illustrative embodiment, this may include the selection of a file or file folder containing any number of images including a file dedicated to the storage of a user's entire collection of images. In another illustrative embodiment, the selection of images may comprise the selection images taken in the same geographic location, same time period, or have similar qualities. For example, the user could direct the system to select all images which where taken over a two day trip or all images taken at the Grand Canyon. In one embodiment, the user may filter the images based on information such as the camera type or camera settings. For example, the user may request that an album be generated of all macro shots taken with a Photosmart® R967 camera. In another illustrative embodiment, the present system and method may automatically select a group of images based on a similar theme.

As optional step, a number of images may next be selected as "favorite" images (step 315). As discussed above, in one illustrative embodiment, favorite images may be selected automatically wherein the present system selects the favorite images based on relative unusualness of the images, emotional value of the images, the facial expressions of the people in the images, the number of people in the images, whether the images are close up portraits, whether the images have been used in past photo albums, whether the images have been previously searched or viewed, or any other distinguishing factor. In another illustrative embodiment, favorite images may be selected manually by a user. Once selected, the system may be configured such that these favorite images must appear in all potential photo album compilations.

Next, images that are of poor quality may be identified and may be removed from the total pool of images that are to be processed and included in the photo album (step 320). The poor quality images removed according to a number of predetermined criteria, such as images that are out of focus, do not capture the entirety of the subject or subjects of the image, or otherwise do not provide an accurate depiction of the subject matter. In one illustrative embodiment, these images are designated as set B images, and may not appear in the album. In another illustrative embodiment, these B images will appear in the album only if they are required to fill the remaining $P_{min}$ amount of pages when all other viable images fill less than the $P_{min}$ amount of pages.

Metadata may then be derived from the various images based on the content of the images (step 325). As discussed above, the present system and method may automatically or manually arrange images in a photo album page or other compilation of images based on the content or subject matter of the images. The images may be arranged based on colors present in the images, the overall complexity of the images, the number of subjects within the images, or the layout of the subjects in the images by applying image analysis techniques such as color segmentation, face detection, and face feature detection in deriving metadata that reflects such design aspects. Based on the metadata derived from the images, the system may arrange the images on a page. Further, the system may provide recommendations to a user, and the user may manually arrange the images on a page. Thus, the system analyses each image, derives the metadata from each image, and, based on the derived metadata, provides page arrangement recommendations or hints.

Next, the present system and method may identify duplicate images among the images selected, and select the best image or images from the duplicate images (step 330). In one illustrative embodiment, duplicate images may be classified as any plurality of images that are similar in all of the following respects: same color appearance, same number of people, same people, same page arrangement recommendations, and combinations thereof. Duplicates are those images that are so similar that the inclusion of a duplicate would not contribute or add to the aesthetic qualities of the photo album or other compilation.

In one illustrative embodiment, when determining the "best" image among duplicate images, the system may be configured to consider several factors including, but in no way limited to, sharpness of the image, pleasing facial expressions, number of faces in an image, color variances within the image, and combinations thereof. In one illustrative embodiment, duplicate images are designated as set D images, and, like set B images, may only be added to the photo album when the number of images, excluding those in B or D set of images, is less than $P_{min}$. In this case, images from the D set of images may be added to the compilation in order to achieve $P_{min}$ pages in the album.

The present system and method may next form clusters of images C (step 335) wherein the images are grouped according to a common characteristic or theme. The various images may be grouped or clustered based on common themes including, but not limited to, time the images were taken, the dominant colors in the images, whether the same person is depicted in the images, the location where the images were taken, the composition of groups of people depicted in the images, and combinations thereof. According to one illustrative embodiment, the number of clusters may be less than or equal to the maximum number of pages in the photo album $P_{max}$ ($C \leq P_{max}$), so that each cluster provides a "theme" for one or more photo album pages. Optionally step 335 may be repeated any number of times with different clustering criteria, or with fewer clusters in order to explore the possibilities of fewer multi-page clusters. In most cases, the total number of images, excluding those images in the B and D sets of images, is significantly more than the number of images to fill the minimum number of photo album pages, $P_{min}$. However, if this is not the case, then each image, excluding those in B and D, may be allocated to a single page. Additional images from set D, and then, if necessary, set B, may be used to fill $P_{min}$ pages.

In many cases, each cluster C of images will contain more images than can be placed on a given page of a photo album or other compilation of images, without causing a high $Z_{content-layout}$ penalty due to making the images undesirably small. Thus, a subset of images may be selected (step 340) such that those selected images' associated page arrangement recommendations do not conflict. A number of illustrative criteria could then be applied. For example, if a given cluster contains a "favorite" image or images, then these images must be selected. Further, as an illustrative example of ensuring that no conflict between page arrangement recommendations of images exist, no more than two images with page arrangement recommendations to be on the same side of the page may be selected. Similarly, as another example of ensuring that no conflict between page arrangement recommendations of images exist, only one image requiring at least 50% of page area will be selected for a given page. In cases where the number of clusters $C<P_{max}$, clusters containing many images, or with images which have many conflicting arrangement requirements may generate multiple album pages, or double-page spread layouts.

In addition, the image combinations to be arranged on a page or double page may be selected to ensure a low $Z_{selection}$ penalty.

Many alternative combinations of images can be tested as possible page combinations. In this way, the overall system is able to evaluate different album variants in its search for an album with the lowest $Z_{album}$ penalty. In one embodiment, a heuristic is used to ensure that only reasonably good combinations are considered. A suitable heuristic is to only consider combinations of images whose $Z_{selection}$ penalty value falls below some limit. In one illustrative embodiment, this predetermined $Z_{selection}$ penalty value may be set at less than 1.25 times the lowest possible $Z_{selection}$ penalty value. A similar heuristic constraint may be used to avoid combinations of images which are likely to incur a high potential $Z_{content-layout}$ penalty.

Next, an auto-crop cost function for different aspect ratios is calculated for each image (step 350). In one illustrative embodiment, the present system and method may be configured to generate an array of cost values for different aspect ratios. For each aspect ratio, the minimum cost value may be retained. The array is effectively a sampling of a continuous function of "aesthetic crop penalty" versus aspect ratio. This function may be called the "crop cost function" for the image. The value of this function is the lowest crop cost metric for each aspect ratio, regardless of the size and position of the particular crop rectangle with that aspect ratio.

As a next step, the present system and method arranges a number of images on a given page of the photo album taking into consideration the image arrangement recommendations with regard to size, position, and alignment, while factoring in the values obtained from step 350 regarding the crop cost function of each image (step 355). In one illustrative embodiment, the present system and method may take, as input, a set of crop cost functions, one for each image to be placed. An optimization search may be performed to select the aspect ratio for each image as well as its size and location. The optimization criterion is then a combined layout and crop metric; the crop component being formed by the sum of the crop cost values for each image, and the crop cost value for an image being the value of its crop cost function for its selected aspect ratio. The layout component consists of both the shape component, $Z_{shape-layout}$ which reflects problems with the aesthetic quality of the spatial arrangement of the image boundary shapes, and the content component, $Z_{content-layout}$, which reflects the problems with aesthetic quality of the relative positions and sizes of the images in the arrangement, based on their content. In one illustrative embodiment, the simplest way of performing the optimization search may be to repeat the basic search with all combinations of aspect ratios for each image using a set of specific aspect ratios to sample the crop cost functions of each image. Each combination of aspect ratios may then be arranged, and the combined arrangement and crop cost function may be evaluated. The minimum cost arrangement is retained as the optimal. When the optimal set of aspect ratios have been chosen, the autocrop process is then re-invoked for each image, this time requesting a crop of the chosen aspect ratio. The appropriate aspect ratio crop is returned for insertion into a page arrangement.

In one illustrative embodiment, the page penalty function, $Z_{page}$, is minimized. Because the $Z_{selection}$ value is fixed for all arrangements of the specified images, the present system and method is configured to attempt to minimize the sum of the remaining terms, $Z_{crop}$, $Z_{content-layout}$, and $Z_{shape-layout}$. For example, if an aggressive auto-crop algorithm is used, it may be necessary for the page arrangement recommendations for each image to be recalculated for dramatically different crops in order to reduce the $Z_{page}$ penalty value.

Finally, combinations of pages that are generated from the above steps for each cluster may be accumulated into possible albums (step 360). The combination of pages may be selected such that the page count requirement is satisfied (e.g. $P_{min}$<Actual Number of Pages<$P_{max}$). The overall penalty value, $Z_{album}$, may then be calculated the album (step 365). The above process, as shown in steps 330 through 365, can then be repeated to determine the overall album penalty for a plurality of albums (step 370). As discussed above, even through these albums are based on the same image pool, each of the albums may be unique in layout, included pictures, length, and other factors. The system then selects the album or albums with the lowest $Z_{album}$ value for presentation to the user (step 375).

Therefore, a system and method for creating an album or other compilation of images that allow design considerations to control the overall optimization of the album is disclosed. More specifically, illustrative systems and methods for selecting, editing, and arranging a number of images in an album or other compilation while satisfying many design constraints is disclosed. Moreover, illustrative systems and methods may apply various techniques in satisfying these design constraints including, but not limited to, content-based selection and arrangement of images, auto-cropping of images, and penalty-based selection, editing, and arrangement of images for use in creating an aesthetically appealing compilation of images. The present system and method then allows a user to manually or automatically arrange the images to create a compilation of images that are aesthetically pleasing. The present system and method provides for a means for a user to quickly and conveniently prepare a photo album or other compilation of images without the cost of hiring a professional designer. Further, the present system and method provides for a means for a user to quickly and conveniently prepare a photo album or other compilation of images via a webpage embodied on a server that is external to the present system. Thus, a user may upload, store, edit, and enhance the digital images via the webpage, as well as arranging the images within a photo album. Therefore, the present system and method may provide a more cost effective means of producing a printed copy of a photo album from a user's personal computer without having to purchase separate computing devices, software, etc.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for creating an image album comprises:
   selecting a subset of images from a source set;
   arranging the subset of images over one or more pages using predetermined design considerations;
   wherein arranging the subset of images comprises clustering images in the subset of images, a cluster being based on composition of groups of people depicted in images of the subset of images;
   determining a page in an album having a maximum penalty score among pages in that album; and
   weighting that maximum penalty score in the penalty score for that album.

2. The method according to claim 1, wherein said arranging the subset of images is repeated to create a plurality of different proposed image albums, said method further comprising:
   evaluating each image album using a penalty detection unit to generate a penalty score, the penalty score being a measure of aesthetic quality of the image album based on said predetermined design considerations; and
   presenting a user with one or more image albums having the lowest penalty scores.

3. The method according to claim 1, further comprising selecting favorite images from among the subset of images, all of the favorite images being incorporated into the image album.

4. The method according to claim 1, wherein said clustering is also performed based on a time the images were taken, dominant colors in the images, and location where the images were taken.

5. The method according to claim 1, wherein one of said design considerations is what direction persons in the images are facing.

6. A method for creating an image album comprises:
   selecting a subset of images from a source set;
   creating a plurality of image albums by arranging the subset of images over one or more pages using said predetermined design considerations;
   evaluating each image album using a penalty detection unit to generate a penalty score, the penalty score being a measure of aesthetic quality of the image album based on said predetermined design considerations;
   presenting a user with one or more image albums having the lowest penalty scores; and
   identifying a number of favorite images in the source set of images; and
   increasing an image album penalty based on failure to include or emphasize one of said favorite images in the image album.

7. The method according to claim 6, in which the penalty score comprises an average of page penalties generated for each page within one of the image albums, each page penalty comprising penalties assessed against a particular page based on two or more of said design considerations.

8. The method according to claim 7, in which the page penalties comprise: a weighted selection penalty, a weighted crop penalty, a weighted content-layout penalty and a weighted shape-layout penalty.

9. The method according to claim 6, further comprising analyzing images within the subset of images to derive metadata corresponding to individual analyzed images, an image arranging unit using the metadata as one factor in creating an arrangement of the images over one or more album pages.

10. The method according to claim 9, in which the metadata describes at least one of: colors present in the image, image complexity, the number of subjects in the image, and face feature detection.

11. The method according to claim 6, further comprising clustering images in the subset of images, a cluster being based on composition of groups of people depicted in images of the subset of images.

12. The method according to claim 6, further comprising:
clustering images in the subset of images based on a cluster criteria; and
arranging a portion of images within a cluster over consecutive pages of the image album.

13. The method according to claim 6, further comprising identifying and removing poor quality images according to predetermined criteria.

14. The method according to claim 6, further comprising:
identifying duplicate images in the subset of images; and
selecting at least one image from among the duplicate images to be included in the image album.

15. The method according to claim 6, further comprising analyzing images within the subset of images to derive metadata, an image arranging unit using the metadata as one factor in creating an arrangement of the images over one or more album pages.

16. A system for arranging a number of images into an image album comprising a computing device, said computing device comprising:

an image selection unit to select images from a source set of images;

an image arranging unit to arrange selected images into a plurality of image albums, said image arranging unit arranging selected images using a number of predetermined design considerations; and a penalty detection unit to calculate a penalty score for each image album the penalty score being a measure of aesthetic quality of the image album based on said predetermined design considerations;

wherein said penalty detection unit is further to:

determine a page in an album having a maximum penalty score among pages in that album; and weigh the maximum penalty score in the penalty score for that album.

17. The system according to claim 16, further comprising a metadata derivation unit to evaluate the selected images to derive metadata which describes one or more visual characteristics of the selected images.

18. The system according to claim 17, further comprising, an auto-cropping unit to determine an auto-crop cost function for different aspect ratios for the images, the auto cropping unit being to automatically crop images based on the autocrop cost function.

19. The system according to claim 16, further comprising, an auto-cropping unit to determine an auto-crop cost function for different aspect ratios for the images, the auto cropping unit being to automatically crop images based on the autocrop cost function.

* * * * *